(12) United States Patent
Bernard

(10) Patent No.: US 10,014,938 B2
(45) Date of Patent: Jul. 3, 2018

(54) OPTICAL NETWORK TERMINAL WAVELENGTH NOTIFICATION

(71) Applicant: Calix, Inc., Petaluma, CA (US)

(72) Inventor: Christopher T. Bernard, Wayzata, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

(21) Appl. No.: 15/240,017

(22) Filed: Aug. 18, 2016

(65) Prior Publication Data
US 2017/0117962 A1    Apr. 27, 2017

Related U.S. Application Data

(60) Provisional application No. 62/245,605, filed on Oct. 23, 2015.

(51) Int. Cl.
| | |
|---|---|
| *H04B 10/079* | (2013.01) |
| *H04J 14/02* | (2006.01) |
| *H04Q 11/00* | (2006.01) |
| *H04B 10/272* | (2013.01) |

(52) U.S. Cl.
CPC ..... *H04B 10/07957* (2013.01); *H04B 10/272* (2013.01); *H04J 14/025* (2013.01); *H04J 14/0227* (2013.01); *H04Q 11/0066* (2013.01); *H04Q 2011/0073* (2013.01)

(58) Field of Classification Search
CPC ........... H04B 10/07957; H04J 14/0227; H04Q 11/0066; H04Q 2011/0073
See application file for complete search history.

(56) References Cited

U.S. PATENT DOCUMENTS

| | | | | | |
|---|---|---|---|---|---|
| 5,548,434 | A | * | 8/1996 | Shimonaka | H04B 10/1125 398/158 |
| 5,625,478 | A | * | 4/1997 | Doerr | H04B 10/27 340/2.2 |
| 8,854,228 | B1 | * | 10/2014 | Klissner | G06F 11/325 340/691.1 |
| 9,853,764 | B2 | * | 12/2017 | Khotimsky | H04J 14/0257 |

(Continued)

OTHER PUBLICATIONS

Series G: Transmission Systems and Media, Digital Systems and Networks, Digital sections and digital line system—Optical line systems for local and access networks, 40-Gigabit-capable passive optical networks 2 (NG-PON2): Physical media dependent (PMD) layer specification; ITU-T G.989.2, Dec. 2014, 108 pp.
Series G: Transmission Systems and Media, Digital Systems and Networks, Digital sections and digital line system—Optical line systems for local and access networks, 40-Gigabit-capable passive optical networks (NG-PON2): Transmission convergence layer specification, ITU-T G.9893, Oct. 2015, 250 pp.

(Continued)

*Primary Examiner* — Danny Leung
(74) *Attorney, Agent, or Firm* — Shumaker & Sieffert, P.A.

(57) ABSTRACT

Techniques are described for indicating a wavelength at which a network interface device is configured to operate. A first controller circuit may determine a wavelength at which the network interface device is operating. The wavelength at which the network interface device is operating includes at least one of an optical wavelength at which a laser of the network interface device is transmitting optical data or an optical wavelength at which a photodiode of the network interface device is receiving optical data. A second controller circuit may cause the network interface device to output a sensory output that indicates the wavelength at which the network interface device is operating.

20 Claims, 4 Drawing Sheets

(56) References Cited

U.S. PATENT DOCUMENTS

| | | | |
|---|---|---|---|
| 2002/0071159 A1* | 6/2002 | Lange | H04J 14/02 398/135 |
| 2005/0226621 A1* | 10/2005 | Kikuchi | H04J 14/021 398/83 |
| 2006/0153496 A1* | 7/2006 | Tanobe | H04J 14/0227 385/24 |
| 2009/0016726 A1* | 1/2009 | Suzuki | H04B 10/0793 398/79 |
| 2011/0125515 A1* | 5/2011 | Lytle | G06Q 10/10 705/2 |
| 2013/0302029 A1* | 11/2013 | Lee | H04B 10/07 398/25 |
| 2013/0302030 A1* | 11/2013 | Sanchez Yanguela | H04Q 11/0067 398/33 |
| 2014/0093246 A1* | 4/2014 | Sambo | H04J 14/0201 398/83 |
| 2015/0063816 A1* | 3/2015 | Papakos | H04J 14/021 398/83 |
| 2015/0125153 A1* | 5/2015 | Lee | H04B 10/0793 398/79 |
| 2015/0365191 A1* | 12/2015 | Lee | H04J 14/0246 398/67 |
| 2016/0080105 A1* | 3/2016 | Khotimsky | H04J 14/0232 398/34 |
| 2017/0117962 A1* | 4/2017 | Bernard | H04B 10/07957 |

OTHER PUBLICATIONS

Series G: Transmission Systems and Media, Digital Systems and Networks, Digital sections and digital line system—Optical line systems for local and access networks, Broadband optical access systems based on Passive Optical Networks (PON), ITU-T G.983.1, Jan. 2005, 124 pp.

Series G: Transmission Systems and Media, Digital Systems and Networks, Digital sections and digital line system—Optical line systems for local and access networks, Gigabit-capable passive optical networks (GPON): General characteristics, ITU-T G.984.1, Mar. 2008, 43 pp.

Series G: Transmission Systems and Media, Digital Systems and Networks, Digital sections and digital line system—Optical line systems for local and access networks, 10-Gigabit-capable passive optical network (XG-PON) systems: Definitions, abbreviations and acronyms, ITU-T G.987.1, Jun. 2012, 26 pp.

Series G: Transmission Systems and Media, Digital Systems and Networks, Digital sections and digital line system—Optical line systems for local and access networks, 40-Gigabit-capable passive optical networks (NG-PON2): General requirements, ITU-T G.989.1, Mar. 2013, 26 pp.

IEEE Std. 802.3ah-2004, "Part 3: Carrier Sense Multiple Access with Collision Detection (CSMAICD) Access Method and Physical Layer Specifications Amendment: Media Access Control Parameters, Physical Layers and Management Parameters for Subscriber Access Networks," Sep. 7, 2004, 640 pp. [uploaded in parts].

* cited by examiner

OPTICAL NETWORK TERMINAL WAVELENGTH NOTIFICATION

This application claims the benefit of U.S. Provisional Patent Application No. 62/245,605, filed Oct. 23, 2015, the content of which is incorporated by reference herein.

TECHNICAL FIELD

This disclosure relates to networking, and more particularly, to an optical network terminal (ONT) that operates at different wavelengths.

BACKGROUND

Network interface devices permit a subscriber to access a variety of information via a network. A passive optical network (PON), for example, can deliver voice, video and data among multiple network nodes, using a common optical fiber link. Passive optical splitters and combiners enable multiple network interface devices such as optical network terminals (ONTs), also referred to as optical network units (ONUs), to share the optical fiber link. Each network interface device terminates the optical fiber link for a residential or business subscriber, and is sometimes referred to as a subscriber premises node that delivers Fiber to the Premises (FTTP) services.

A network interface device is connected with wiring to one or more subscriber devices in the subscriber premises, such as televisions, set-top boxes, telephones, computers, or network appliances, which ultimately receive the voice, video and data delivered via the PON or an active optical network. In this manner, the network interface device can support delivery of telephone, television and Internet services to subscriber devices in the subscriber premises.

SUMMARY

In general, this disclosure describes example techniques for identifying a particular wavelength at which an optical network terminal (ONT) is operating. As one example, the ONT searches for a wavelength pair, i.e., first and second wavelengths, at which the ONT is to transmit and receive, respectively, optical signals. The ONT generates and outputs information indicating the wavelength pair at which the ONT is transmitting and receiving optical signals.

In one example, the disclosure describes an example of a method comprising determining a wavelength at which a network interface device is operating, wherein the network interface device is configurable to operate at a plurality of different wavelengths, and wherein the wavelength at which the network interface device is operating comprises at least one of an optical wavelength at which a laser of the network interface device is transmitting optical data or an optical wavelength at which a photodiode of the network interface device is receiving optical data, and outputting, with the network interface device, a sensory output that indicates the wavelength at which the network interface device is operating.

In one example, the disclosure describes an example of a network interface device comprising a laser, a photodiode, a first controller circuit configured to determine a wavelength at which the network interface device is operating, wherein the network interface device is configurable to operate at a plurality of different wavelengths, and wherein the wavelength at which the network interface device is operating comprises at least one of an optical wavelength at which the laser of the network interface device is transmitting optical data or an optical wavelength at which the photodiode of the network interface device is receiving optical data, and a second controller circuit configured to cause the network interface device to output a sensory output that indicates the wavelength at which the network interface device is operating.

In one example, the disclosure describes an example of a computer-readable storage medium storing instructions thereon that when executed cause one or more processors of a network interface device to determine a wavelength at which the network interface device is operating, wherein the network interface device is configurable to operate at a plurality of different wavelengths, and wherein the wavelength at which the network interface device is operating comprises at least one of an optical wavelength at which a laser of the network interface device is transmitting optical data or an optical wavelength at which a photodiode of the network interface device is receiving optical data, and cause the network interface device to output a sensory output that indicates the wavelength at which the network interface device is operating.

In one example, the disclosure describes an example of a network interface device comprising a laser, a photodiode, means for determining a wavelength at which the network interface device is operating, wherein the network interface device is configurable to operate at a plurality of different wavelengths, and wherein the wavelength at which the network interface device is operating comprises at least one of an optical wavelength at which the laser of the network interface device is transmitting optical data or an optical wavelength at which the photodiode of the network interface device is receiving optical data, and means for outputting a sensory output that indicates the wavelength at which the network interface device is operating.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
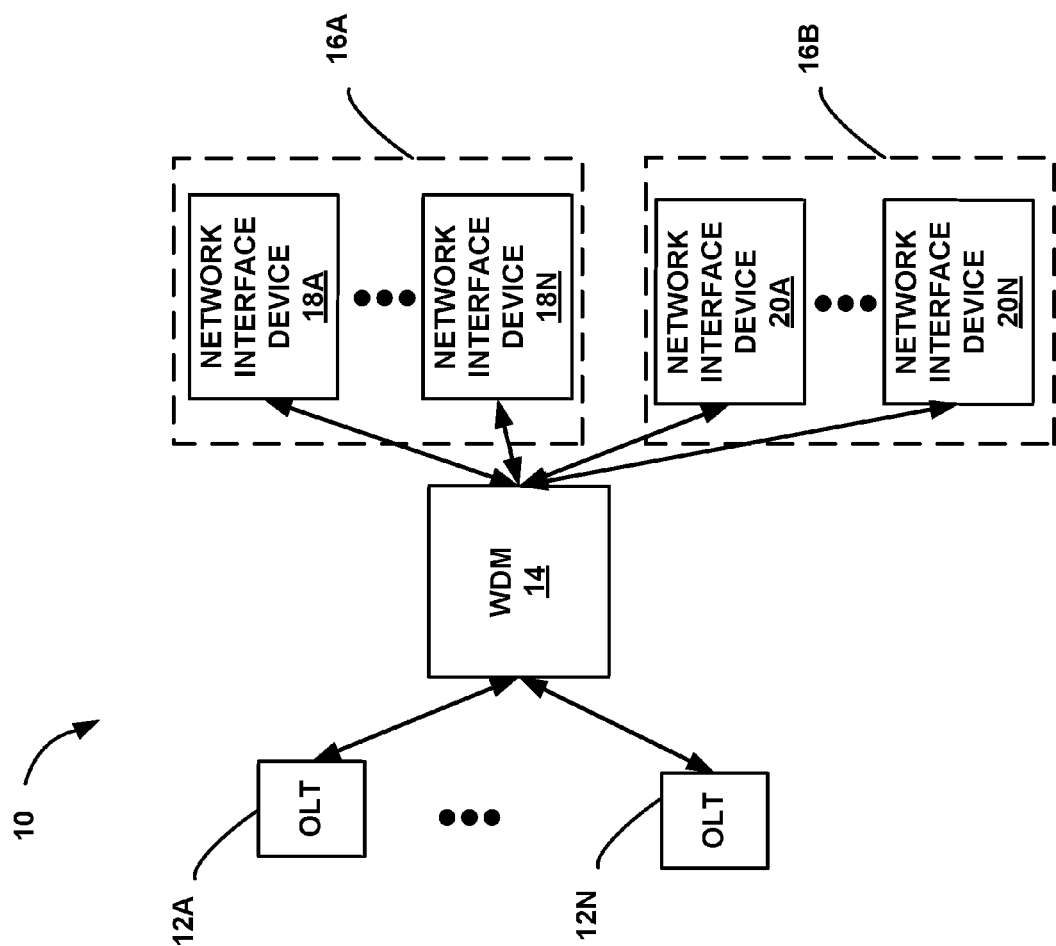
FIG. 1 is a block diagram illustrating a multi-wavelength passive optical network (PON), in accordance with one or more aspects of this disclosure.

The examples described in this disclosure provide for ways for an optical network terminal (ONT), also referred to as an optical network unit (ONU), to provide a notification of the wavelength at which it is operating. The ONT may be configured to be part of a multiple wavelength system. An example of a multiple wavelength system is the ITU-T G.989 (NGPON-2) standard. In a multiple wavelength system, there may exist a plurality of optical line terminals (OLTs). The OLTs may be at different geographical locations, on different OLT cards within the same chassis, or in other configurations with multiple OLTs. In some examples of the multiple wavelength system, there may be at least one OLT that is configured to transmit and receive optical signals via multiple different wavelengths. For ease of illustration, the examples are described with respect to there being multiple OLTs in a multiple wavelength system. Also, the ONTs that are configured to be part of the wavelength system are referred to as network interface devices.

In a multiple wavelength system, each OLT of a plurality of OLTs is associated with a set of network interface devices and communicates (e.g., transmits and receives) only with the network interface devices within the associated set. For example, in the multiple wavelength system, a first OLT is associated with a first set (e.g., group) of one or more network interface devices (e.g., ONTs) and communicates with the one or more network interface devices that belong to the first set. In the multiple wavelength system, a second OLT is associated with a second set of different one or more network interface devices and communicates with the one or more network interface devices that belong to the second set, and so forth.

After initialization and assignment of network interface devices to OLTs, an OLT may not be able to transmit downstream optical signals to a network interface device to which it is not associated. In general, after initialization and assignment of network interface devices to OLTs, a network interface device should not transmit upstream optical signals to an OLT to which it is not associated.

To effectuate such communication, each OLT may be assigned different upstream/downstream wavelength pairs, and each set of network interface devices may be assigned different upstream/downstream wavelength pairs relative to the other sets of network interface devices. As an example, a first OLT may be configured to transmit downstream optical signals at a first downstream wavelength, and receive upstream optical signals at a first upstream wavelength. The first set of network interface devices, associated with the first OLT, may be configured to receive downstream optical signals at the first downstream wavelength, and transmit upstream optical signals at the first upstream wavelength.

A second OLT may be configured to transmit downstream optical signals at a second downstream wavelength different from the first downstream wavelength, and receive upstream optical signals at a second upstream wavelength different from the second upstream wavelength. Each of the upstream wavelengths also may be different from the downstream wavelengths. The second set of network interface devices, associated with the second OLT, may be configured to receive downstream optical signals at the second downstream wavelength, and transmit upstream optical signals at the second upstream wavelength. In this example, each of the wavelengths is different than the other wavelength. For instance, the first downstream wavelength is different than the second downstream wavelength, the first upstream wavelength, and the second upstream wavelength, and the same is true for the second downstream wavelength, the first upstream wavelength, and the second upstream wavelength, relative to one another. Therefore, none of the wavelengths are the same.

In some cases, during initialization or during operation, the exact wavelength at which the network interface device is operating may be unclear. In the techniques described in this disclosure, the network interface device may be configured to output information indicating the wavelength at which the network interface is operating, e.g., so that a user may observe the wavelength. There may be two wavelengths at which the network interface device operates: a transmit wavelength (e.g., upstream wavelength) and a receive wavelength (e.g., downstream wavelength). In some examples, separate units that output the wavelength indication, one for each of the transmit and receive wavelengths, may indicate the respective wavelengths (e.g., two separate multi-color light emitting diodes (LED)s as indicator lights, one for each wavelength). In this example, the different colors that the LEDs can output indicate the different wavelengths.

In some examples, a single unit that outputs the wavelength indication (e.g., one multi-color LED) may be sufficient to indicate the wavelength(s) at which the network interface is operating. For example, a network interface device may receive at a first downstream wavelength and transmit at a first upstream wavelength. Therefore, the first downstream wavelength and the first upstream wavelength form a wavelength pair, and the indicator may be associated with the wavelength pair. In this example, the different colors that the LED can output indicate the different wavelength pairs.

There may be various ways in which the network interface device may be configured to output an indication of the wavelength or wavelength pair on which the network interface device is operating. As one example, the network interface device includes a multi-color light-emitting diode (LED). Each color that the LED can output maps to a wavelength pair (e.g., first color maps to first wavelength pair, second color maps to second wavelength pair, and so on). If the network interface device is configured to operate at the first wavelength pair, the network interface device may cause the LED to output light at the first color, if the network interface device is configured to operate at the second wavelength pair, the network interface device may cause the LED to output light at the second color, if the network interface device is configured to operate at a third wavelength pair, the network interface device may cause the LED to output light at a third color, and so forth.

There may be a legend or key that shows to the user which color indicates which wavelength pair. This legend or key may be pre-generated. As another example, the user may program the color and wavelength pair association and generate the key or legend after defining the association.

In some cases, the LED, when illuminated, may be relatively bright. For example, the LED may be located within the network interface device, and when illuminated, the LED causes the network interface device to appear to light up, e.g., with a particular color. In this way, the wavelength at which the network interface device is operating can be easily identified. For example, if there are multiple network interface devices in a room or chassis, the user may be able to very quickly identify at which particular wavelength or wavelength pairs the individual network interface devices are operating.

Although the example is illustrated with respect to illuminating an LED at a particular color to indicate the wavelength pair, the techniques described in this disclosure are not so limited. In some examples, the network interface device may include a display that outputs information indicative of the wavelength or wavelength pair. In some examples, the network interface device may include a speaker that outputs acoustic information indicative of the wavelength or wavelength pair. Other example ways to indicate the wavelength are possible such as tactile outputs and are contemplated by this disclosure.

In general, the output that the network interface device outputs may be a sensory output (e.g., visual or acoustic, or even tactile based on vibrations). Accordingly, the network interface device may be considered as determining a wavelength at which a network interface device is operating, and outputting a sensory output, observable by a user, that indicates the wavelength at which the network interface device is operating. This sensory output may be outputted directly by the network interface device without any intermediate devices used to convert the information outputted by the network interface device into an output indicative of the wavelength or wavelength pairs.

FIG. 1 illustrates a multiple wavelength system 10. One example of system 10 is an ITU-T G.989 (NGPON-2) conforming system. System 10 includes OLTs 12A-12N. For ease of illustration, the various components that couple to OLTs 12 for voice, data, and video are not illustrated in FIG. 1, but illustrated in FIG. 2.

NG-PON2 (ITU G.989.2) (i.e., SERIES G: TRANSMISSION SYSTEMS AND MEDIA, DIGITAL SYSTEMS AND NETWORKS Digital sections and digital line system—Optical line systems for local and access networks 40-Gigabit-capable passive optical networks 2 (NG-PON2): Physical media dependent (PMD) layer specification, published December 2014), describes techniques that utilize multiple discrete wavelengths on a single fiber to dramatically increase capacity over traditional GPON. A unique characteristic of multi-wavelength PON is that the ONUs (e.g., network interface device) can optionally be designed to support multiple channels (e.g., wavelength or wavelength pairs) using tunable receivers and/or lasers. Unlike fixed wavelength optics, ONUs which tune have a new dimension of complexity in that they can operate on many independent networks simply by tuning to a new channel. Without some indication (e.g., visual indication), there may be no way to know the channel on which an ONT is operating.

ONUs have traditionally had LEDs to convey specific information to an end user and/or technician such as power status, transport, telephony, Ethernet link, etc. These are generally single-color LEDs and show binary information (on/off, yes/no, etc). With NG-PON2, an ONU may tune itself to one of 8 wavelengths, making wavelength notification by a binary representation difficult or infeasible.

This disclosure describes using a multi-color RGB LED and a pre-determined color-scheme to convey wavelength information to a technician or end-user. Use of a multi-color RGB LED is provided for purposes of illustration only, and should not be considered limiting. There may be other ways to convey wavelength information such as acoustic outputs or a display screen that outputs the wavelength information, as a few more examples.

In system 10, each one of OLTs 12A-12N may transmit downstream optical signals and receive upstream optical signals at specific wavelengths that are different from one another. For example, OLT 12A transmits optical signals at a first downstream wavelength, and receives optical signals at a first upstream wavelength. OLT 12N transmits optical signals at a second downstream wavelength, and receives optical signals at a second upstream wavelength. Each of these downstream wavelengths is different than each of the other downstream wavelengths and each of the upstream wavelengths. Each of these upstream wavelengths is different than each of the other upstream wavelengths and each of the downstream wavelengths.

In some examples, OLTs 12A-12N may not all be the product of the same company. In some examples, OLTs 12A-12N may be located in different geographical locations. In some examples, OLTs 12A-12N may be located together within the same chassis or located together within proximity of one another, e.g., with the same room or building. In some examples, rather than having multiple OLTs 12A-12N, system 10 may include one OLT with multiple transmitters and receivers where each transmitter is configured to transmit downstream optical signals at different downstream wavelengths, and each receiver is configured to receive upstream optical signals at different upstream wavelengths (where the downstream and upstream wavelengths are also different). For ease of description, the techniques are described with examples that include multiple OLTs (e.g., OLTs 12A-12N).

Each one of OLTs 12A-12N is associated with (e.g., assigned to) a set of network interface devices (e.g., ONT or ONU). For example, OLT 12A is associated with a set of network interface devices 16A, and OLT 12N is associated with set of network interface devices 16B. Set of network interface devices 16A includes network interface devices 18A-18N, and set of network interface devices 16B includes network interface devices 20A-20N.

In some examples, the upstream and downstream capabilities of network interface devices 18A-18N and 20A-20N may be tunable. For instance, as described above, OLT 12A may be configured to transmit downstream optical signals with a first downstream wavelength and configured to receive upstream optical signals with a first upstream wavelength. In the example of FIG. 1, network interface devices 18 may be tuned to transmit optical signals at the first upstream wavelength and receive optical signals at the first downstream wavelength. Similarly, network interface devices 20 may be tuned to transmit optical signals at the second upstream wavelength at which OLT 12N is configured to receive optical signals, and tuned to receive optical signals at the second downstream wavelength at which OLT 12N is configured to transmit optical signals.

In some examples, network interface devices 18 and 20 may be tunable for distinct wavelengths. For instance, network interface devices 18 and 20 may be tunable to transmit upstream optical signals with wavelength X or with wavelength Y, and not wavelengths between X and Y, or wavelengths other than X or Y. In this example, OLT 12A may be configured to receive upstream optical signals with wavelength X, and OLT 12B may be configured to receive upstream optical signals with wavelength Y. The same may be true for the tuning for the reception of downstream optical signals.

As illustrated, system 10 includes wave division multiplexer (WDM) 14. In the downstream, WDM 14 receives downstream optical signals at respective wavelengths from OLTs 12A-12N, and filters the downstream optical signals so that network interface devices 18 only receive the downstream optical signals with the first downstream wavelength, and so that network interface devices 20 only receive the downstream optical signals with the second downstream wavelength. In the upstream, WDM 14 receives upstream optical signals at respective wavelengths from network interface devices 18 and network interface devices 20, and filters the upstream optical signals so that OLT 12A only receives the optical signals with first upstream wavelength, so that OLT 12N only receives the optical signals with the second upstream wavelength.

Although a single WDM 14 is illustrated in FIG. 1, in some examples there may be multiple WDMs located throughout system 10. As one example, a first WDM may couple to OLTs 12A-12N, and couple to a second WDM via a first fiber link and a third WDM via a second fiber link. The second WDM may be proximate to network interface devices 18, and the third WDM may be proximate to network interface devices 20. Other such configurations are possible to allow OLTs 12A-12N to communicate with network interface devices 18A-18N and 20A-20N.

To assist with understanding, the following is described with network interface device 20A as an example. The other network interface devices may function in a substantially similar way.

During initialization, network interface device 20A may attempt to communicate with OLT 12A. For example, network interface device 20A may configure its laser to output signals at the first upstream wavelength and configure an internal tunable filter to receive signals at the first downstream wavelength. In some examples, network interface device 20A may not be able to establish a communication link with OLT 12A because OLT 12A may determine that network interface device 20A is not to communicate with OLT 12A. In such examples, after some delay, network interface device 20A may configure itself to output at the second upstream wavelength and receive at the second downstream wavelength to try and communicate with OLT 12N.

In some examples, rather than waiting for some delay, OLT 12A may indicate to network interface device 20A that network interface device 20A is to communicate with OLT 12N. In response, network interface device 20A may transition to communicate with OLT 12N.

Because network interface device 20A may change the wavelength pairs on which network interface device 20A operates, network interface device 20A may be configured to indicate the wavelength or wavelength pair on which network interface device 20A is operating. As an example, this disclosure describes a method of conveying wavelength information using a visual color indication based on an RGB LED. The ONU (e.g., network interface device 20A) tunes it receiver and laser to find an appropriate TWDM (time and wavelength division multiplexing) channel to activate and provide service to the end customer.

Once a channel has been determined, network interface device 20A will convert the channel-id (e.g., information identifying the wavelength or wavelength pair) into an RGB pixel value using a pre-determined color scheme (e.g., first color maps to wavelength pair of first downstream wavelength and first upstream wavelength, second color maps to wavelength pair of second downstream wavelength and second upstream wavelength, and so forth in the event more than two different wavelength pairs are possible). The RGB value is converted into serial stream and sent to an external display element using a serialized protocol such as SPI (serial peripheral interface) or IIC (inter-integrated circuit, sometimes also referred to as I²C), as an example. The external display may have a single LED or multiple LEDs. Additionally, the ONT (e.g., network interface device 20A) may fade from one color to the next using intermediate RGB values and sequentially serializing them to an external display.

For example, during activation to a first wavelength pair, network interface device 20A may cause the LED to blink at a first color, and then if activation is completed (e.g., network interface device 20A is confirmed to communicate at the first wavelength pair), then network interface device 20A may cause the LED to illuminate constantly at the first color. If activation is not complete, then network interface device 20A may attempt to communicate a second wavelength pair. In this case, network interface device 20A may cause the LED to blink at the second color during activation to the second wavelength pair. If activation is complete, then network interface device 20A may cause the LED to illuminate constantly at the second color.

There may be various advantages to the techniques described in this disclosure. Conveying wavelength to a user allows for simpler debugging of networks. The color may be part of a larger color scheme, which may be implemented on OLT optics of OLTs 12A-12N, ODN wavelength mux's, and fiber bulkheads. The ONU (e.g., as an example of network interface device 20A) is a tunable element not bound to a physical connection. Having a multi-color LED allows the user, i.e., operator/customer, to know that they are currently operating on the expected wavelength.

There are multiple ways to convey wavelength, such as a series of 'channel' LEDs, a 7-segment display or equivalent to show a channel number, etc. Tunability in NG-PON2 is a 'marquee' feature that allows for a dramatic increase in network capacity.

Some existing techniques may utilize a management system to indicate the wavelength at which a network interface device is operating. However, such a management system may not provide immediate information about the wavelength pairs and may not be easy to understand. With the techniques of this disclosure, the wavelength pair at which network interface device 20A is operating may be immediately indicated and easy to identify in an elegant way of conveying this information that has good look and feel to the information.

In some examples, network interface device 20A converts the wavelength information derived from the NGPON MAC into a pixel map (RGB) value using a lookup table. The wavelength and the ONT operating state together form the lookup table, the output being a pixel map (RGB). The RGB values are then serialized to an external LED module (multiple physical LEDs) which samples the RGB and holds the value while displaying the specified color.

The following may be some effects that can be achieved using multi-color LEDs. As examples, effects may include a fading effect as an ONT tunes from one-channel to the next (blends the colors as it tunes), an operating State effect (e.g., blinking illumination for downstream sync, solid illumination for upstream activation), or loss of channel (fiber pull) effect, e.g., the ONT fades from solid to a spectrum/rainbow to denote loss of optical channel. After timeout, the ONT will hunt for a new active channel. Some additional effects may include multiple uplink WANs (for protection or channel bonding) for which multiple colors may be conveyed. Also, dynamic wavelength allocation/real-time load balancing may have multiple colors shown in some manner. With a strip-like representation, network interface device 20A could show 70% RED, 30% BLUE which would correlate to average utilization on each wavelength. In some examples, LED intensity of the wavelength color varies with Optical Power (visual signal strength indication). The error state for self-diagnosed wavelength problems may also be possible to identify.

In general, the output that network interface device 20A outputs may be a sensory output (e.g., visual or acoustic, or even tactile based on vibrations). Accordingly, network interface device 20A may be considered as determining a wavelength at which a network interface device is operating, and outputting a sensory output that indicates the wavelength at which the network interface device is operating.

Figure 2:
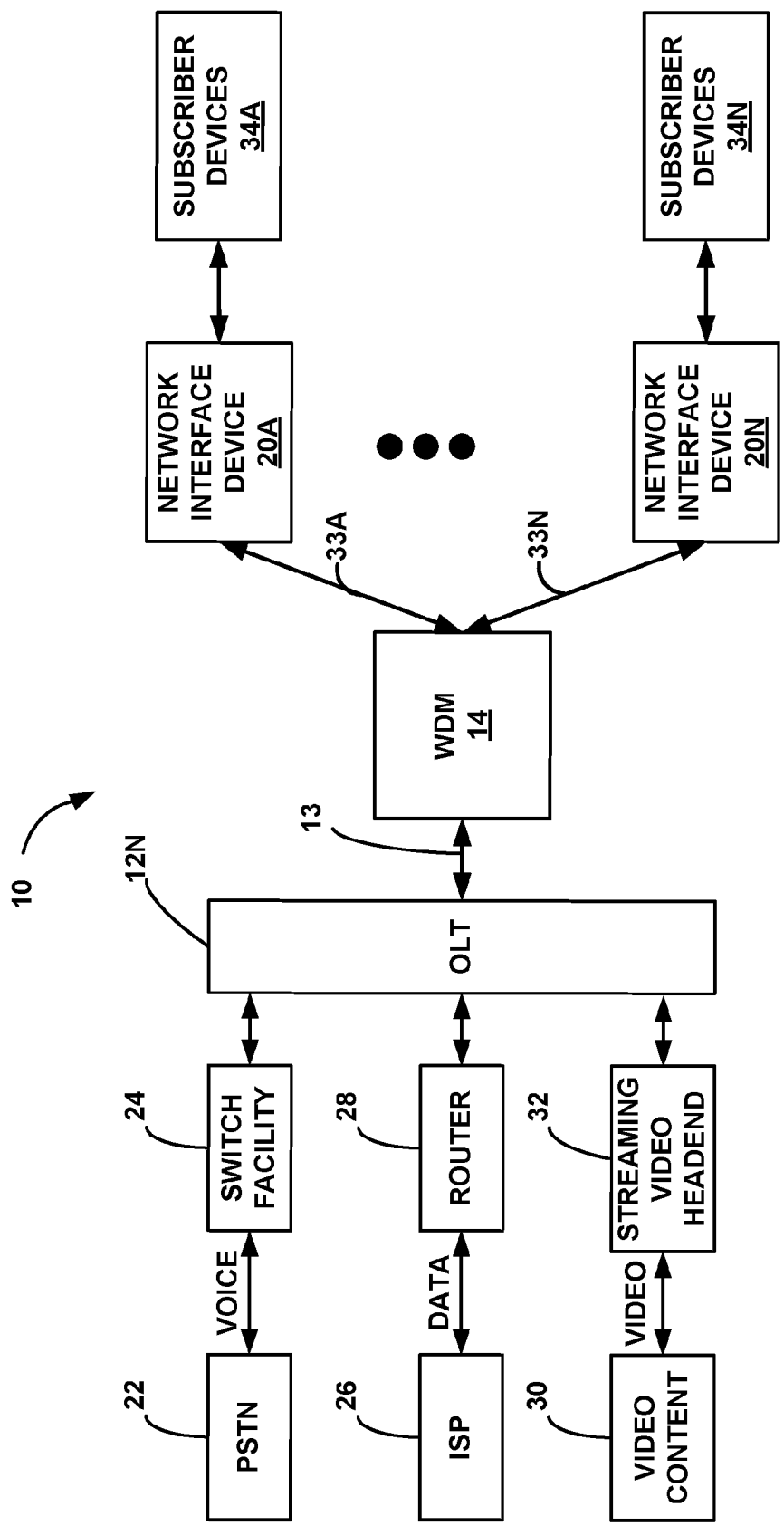
FIG. 2 is a block diagram illustrating the multi-wavelength PON of FIG. 1 in more detail.

FIG. 2 is a block diagram illustrating the multi-wavelength network of FIG. 1 in more detail. For ease, FIG. 2 is described with respect to network interface devices 20A-20N that communicate with OLT 12N via WDM 14.

For purposes of illustration, the example implementations described in this disclosure are described in context of an optical network (e.g., a passive optical network (PON)).

Accordingly, network 10 may be referred to as PON 10. However, aspects of this disclosure are not so limited, and can be extended to other types of networks such as cable or digital subscriber line (DSL) based networks, or Active Ethernet which may be considered as optical transmission and reception in accordance with the Ethernet protocol. Active Ethernet is defined by the IEEE 802.3ah standard (e.g., in clause 59 of the 802.3ah standard). Examples of network 10 also include shared-medium transports such as WiFi and RF/DOCSIS.

As shown in FIG. 2, PON 10 may deliver voice, data and video content (generally "information") to a number of network nodes via optical fiber links. In some examples, PON 10 may be arranged to deliver Internet Protocol television (IPTV) and other high speed information (e.g., information transmitted at approximately 200 Mbps or higher). PON 10 may conform to any of a variety of PON standards, such as the broadband PON (BPON) standard (ITU G.983), Ethernet PON (EPON), the gigabit-capable PON (GPON) standard (ITU G.984), or 10 giga-bit NGPON, as well as future PON standards under development by the Full Service Access Network (F SAN) Group, such as 10G GPON (ITU G.987), or other organizations. As described, PON 10 may be for a multi-wavelength system (e.g., ITU-T G.989 NGPON-2 standard).

Optical line terminal (OLT) 12N may receive voice information, for example, from the public switched telephone network (PSTN) 22 via a switch facility 24. In addition, OLT 12N may be coupled to one or more Internet service providers (ISPs) 26 via the Internet and a router 28. As further shown in FIG. 2, OLT 12N may receive video content 30 from video content suppliers via a streaming video headend 32. Video also may be provided as packet video over the Internet. In each case, OLT 12N receives the information, and distributes it along optical fiber link 13 to WDM 14 (also referred to as optical splitter/combiner 14).

WDM 14 then distributes the information to network interface devices 20A-20N (collectively referred to as "network interface devices 20") via respective fiber optic links 33A-33N (collectively referred to as "fiber optic links 33"). In some examples, PON 10 includes 128 network interface devices 20; however, the aspects of this disclosure are not so limited. Also, network interface devices 20 may be referred to as optical network units (ONUs) or optical network terminals (ONTs).

A single network interface device 20 is an example of a network interface device. Other examples of a network interface device include, but are not limited to, a cable modem or a DSL modem. However, for purposes of illustration but without limitation, the example implementations described in the disclosure are described in the context of the network interface device being an ONU or ONT.

Each one of network interface devices 20 may reside at or near a subscriber premises that includes one or more subscriber devices 34A-34N (collectively referred to as "subscriber devices 34"). For instance, network interface device 20A resides at or near a subscriber premises that includes one or more subscriber devices 34A, and network interface device 20N resides at or near a subscriber premises that includes one or more subscriber devices 34N. The subscriber premises may be a home, a business, a school, or the like. A single network interface device 20 may be capable of transmitting information to and receiving information from one or more subscriber premises.

As illustrated, a single network interface device 20 may directly transmit information to or receive information from one or more subscriber devices 34 within the subscriber premises. Examples of the subscriber devices 34 include, but are not limited to, one or more computers (e.g., laptop and desktop computers), network appliances, televisions, game consoles, set-top boxes, wireless devices, media players or the like, for video and data services, and one or more telephones for voice services. Subscriber devices 34 may also include household appliances such as furnaces, washer and dryers, freezers, refrigerators, thermostats, lights, security systems, and the like.

OLT 12N transmits downstream information to and receives upstream information from network interface devices 20 via fiber link 13 coupled to WDM 14. Downstream information may be considered to be information transmitted by OLT 12N and received by network interface devices 20. Upstream information may be considered to be information transmitted by each one of network interface devices 20 and received by OLT 12N. As illustrated in FIG. 2, WDM 14 may be coupled to each one of network interface devices 20 via respective optical fiber links 33.

In some examples, WDM 14 may be a passive splitter/combiner. A passive splitter/combiner may not need to be powered. For downstream transmission, including voice, video, and data information from OLT 12N, WDM 14 receives the downstream information and splits the downstream information for downstream transmission to network interface devices 20 via respective fiber links 33. For upstream information, including voice and data information from each one of network interface devices 20, WDM 14 receives upstream information from network interface devices 20 via respective fiber links 33 and combines the upstream information for transmission to OLT 12N.

In some examples, WDM 14 may not be a passive splitter/combiner, but rather an active splitter/combiner. In these examples, WDM 14 may be powered locally. In these examples, WDM 14 may function as a switch, router, multiplexer, and the like.

Network interface devices 20 receive and transmit information via respective fiber links 33. Also, OLT 12N receives and transmits information via fiber link 13. To differentiate between transmission and reception, each one of network interface devices 20 may be configured to transmit voice and data information with an optical signal with a wavelength of 1310 nanometer (nm), receive voice and data information with an optical signal with a wavelength of 1490 nm, and receive video information with an optical signal with a wavelength of 1550 nm. OLT 12N may be configured to receive voice and data information with an optical signal with a wavelength of 1310 nm, transmit voice and data information with an optical signal with a wavelength of 1490 nm, and transmit video information with an optical signal with a wavelength of 1550 nm. These wavelengths are provided merely as examples. Also, network interface devices 20 may configure the wavelengths at which network interface devices 20 transmit and receive.

The specific transmit and receive wavelengths indicated above are provided for illustration purposes only. In different examples, network interface devices 20 and OLT 12N may be configured to transmit and receive information with optical signals at different wavelengths than those provided above. However, the transmission and reception wavelengths of the optical signals should be different.

Each one of network interface devices 20 may be configured to transmit upstream information according to time division multiple access (TDMA) techniques. For instance, OLT 12N may grant or assign to each of subscriber devices 34 certain timeslots during which to transmit upstream information. Each one of network interface devices 20 transmits information to OLT 12N based on the timeslots assigned to each of respective subscriber devices 34. The timeslot for each one network interface devices 20 may be different. In this manner, each one of network interface devices 20 may transmit information without collision of information from two or more different network interface devices 20 at WDM 14. Collision of information may occur if WDM 14 receives upstream information from two or more network interface devices 20 at the same time, and possibly at the same wavelength.

As one example of the TDMA techniques, when one of network interface devices 20 (e.g., network interface device 20A), is powered on for the first time, OLT 12N may perform an auto-ranging process, as is well known in the art. For instance, during the auto-ranging process, OLT 12N may calculate the total propagation delay (e.g., the total time it takes to transmit information to network interface device 20A and receive information from network interface device 20A). OLT 12N may perform similar auto-ranging process on each one of network interface devices 20.

After the auto-ranging process, OLT 12N may calculate an equalization delay for each one of network interface devices 20, utilizing techniques well known in the art. The equalization delay equalizes the propagation delay of each one of network interface devices 20, relative to the other network interface devices 20. OLT 12N may transmit the equalization delay to each one of network interface devices 20 utilizing a physical layer operations and maintenance (PLOAM) message or utilizing an ONU management control interface (OMCI) message.

Once all the equalization delays are calculated and transmitted to network interface devices 20, OLT 12N may grant the timeslots during which each one of network interface devices 20 should transmit data (e.g., an optical signal). OLT 12N may transmit a bandwidth map to each one of network interface devices 20 indicating the timeslots during which each one network interface devices 20 should transmit data. OLT 12N may transmit the bandwidth map utilizing a PLOAM (physical layer operations, administration and maintenance) or OMCI (ONT management control interface) message, or other message. In this way, PON 10 utilizes time division multiplexing to precisely synchronize transmission from all ONTs (e.g., network interface devices 20) such that each ONT transmits during a window where all other ONTs are quiet.

In examples described in this disclosure, during the initialization process (e.g., before OLT 12N and network interface devices 20A-20N communicate downstream and upstream data using TDMA techniques, and in some cases before the auto-ranging), network interface devices 20A-20N may determine the optical wavelength or wavelength pairs on which network interface devices 20A-20N are operating. For instance, network interface devices 20A-20N may configure themselves to a first wavelength pair (e.g., first upstream wavelength and first downstream wavelength). Network interface devices 20A-20N may determine whether any data is being received, and if data is being received, network interface devices 20A-20N may stay locked at that wavelength pair. If data is not being received, network interface devices 20A-20N may transition to a second wavelength pair, and repeat these steps until network interface devices 20A-20N identifies a wavelength pair for which network interface devices 20A-20N receive data.

In some examples, rather than toggling through different wavelength pairs, network interface devices 20A-20N may be provided with information indicating to which wavelength pair network interface devices 20A-20N are to transition. For instance, network interface devices 20A-20N may be initially configured to communicate with OLT 12A at a first wavelength pair. Then, OLT 12A outputs information indicating a second wavelength pair to which network interface devices 12A-12N are to transition. In such examples, network interface devices 20A-20N may directly configure themselves to operate at the second wavelength pair.

After network interface devices 20A-20N are operating at the correct wavelength pair, there may not be a clear indication of the wavelength pair network at which interface devices 20A-20N are operating. Knowledge of the wavelength pair at which network interface devices 20A-20N are operating may be useful for a variety of reasons include trouble shooting.

For example, if one of network interface devices 20A-20N is outputting data having a high bit error rate, one possible issue could be that that one of network interface devices 20A-20N is not operating at the correct wavelength pair. However, there may be no easy way to determine that that one of network interface devices 20A-20N is not operating at the correct wavelength pair.

In the examples described in this disclosure, network interface devices 20A-20N may be configured to output sensory information indicative of the operating wavelength. For instance, network interface devices 20A-20N may each include a multi-color LED, and the LED may illuminate at different colors, where each color represents a wavelength or wavelength pair. In this way, the user is made aware of the wavelength at which network interface devices 20A-20N are operating.

Figure 3:
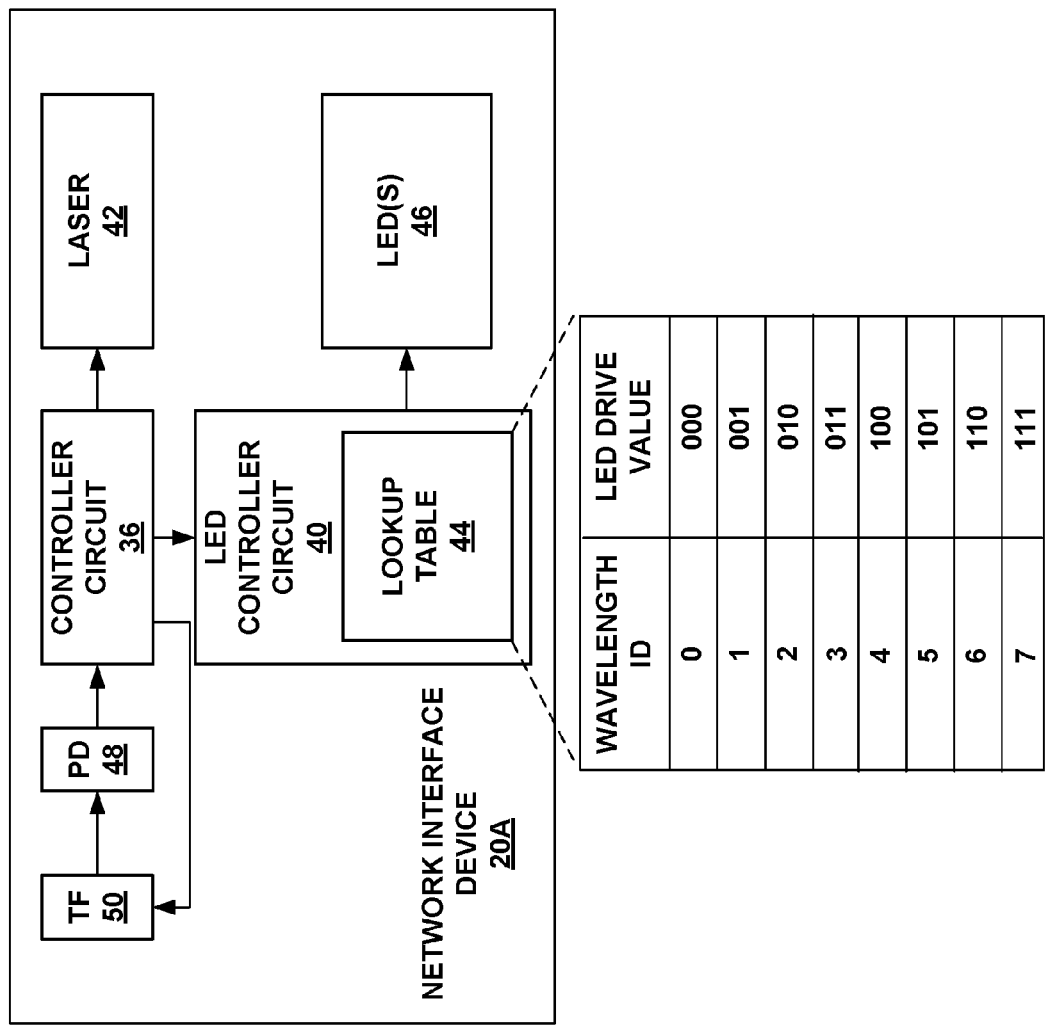
FIG. 3 is a block diagram illustrating a network interface device in accordance with one or more aspects of this disclosure.

FIG. 3 is a block diagram illustrating a network interface device in accordance with one or more aspects of this disclosure. FIG. 3 illustrates network interface device 20A in more detail, and network interface devices 20B-20N may be similar.

Network interface device 20A includes tunable filter (TF) 50, photodiode (PD) 48, controller circuit 36, LED controller circuit 40, laser 42, and one or more LEDs 46. LED controller circuit 40 stores lookup table 44, which is illustrated in greater detail in FIG. 3. Network interface device 20A may include additional components such as a laser driver, a transimpedance amplifier, and other types of amplifiers.

Controller circuit 36 and LED control circuit 40 may be fixed function circuits, programmable circuits, or a combination. Examples of controller circuit 36 and LED control circuit 40 include one or more digital signal processors (DSPs), general purpose microprocessors, application specific integrated circuits (ASICs), field programmable logic arrays (FPGAs), or other equivalent integrated or discrete logic circuitry. The following describes example algorithms that controller circuit 36 and LED control circuit 40 may implement to perform their respective example operations.

Controller circuit 36 may configure network interface device 20A to operate at a particular wavelength or wavelength pair. Controller circuit 36 may store information indicative of different wavelength pairs (e.g., different pairs of downstream and upstream wavelengths). During the initialization process, controller circuit 36 may cycle through the wavelength pairs until network interface device 20A is operating at the correct wavelength.

For example, controller circuit 36 may output a control signal to TF 50 that sets a filter wavelength of TF 50. TF 50 passes through an optical signal having the filter wavelength and blocks all other optical signals. PD 48 receives the output from TF 50 and converts the optical signal into an electrical signal.

Controller circuit 36 may determine whether the amplitude of the electrical signal is higher than a threshold amplitude indicative of whether network interface device 20A is to receive optical signals at that wavelength. For example, assume that network interface device 20A is to receive optical signals having a first wavelength, but controller circuit 36 configured TF 50 to block optical signals having the first wavelength and allow optical signals having a second wavelength. In this example, if network interface device 20A receives an optical signal having the first wavelength, then TF 50 will block this optical signal and PD 48 will not receive much if any optical signal. The result of the optical-to-electrical conversion may be that the output from PD 48 is sufficiently low to indicate to controller circuit 36 that network interface device 20A is not receive optical signals at the second wavelength.

If, however, controller circuit 36 configured TF 50 to allow optical signals having the first wavelength, then PD 48 would receive an optical signal that PD 48 converts to an electrical signal. The amplitude of the electrical signal may be sufficiently large (e.g., greater than or equal to the threshold amplitude) that controller circuit 36 determines that network interface device 20A is to receive optical signals at the first wavelength.

Controller circuit 36 may cycle through wavelengths (e.g., set the filter wavelength of TF 50 to particular wavelengths) until the amplitude of the optical-to-electrical converted signal is greater than or equal to the threshold amplitude. Controller circuit 36 may then keep network interface device 20A operating at that wavelength (e.g., not change the filter wavelength of TF 50).

For each wavelength at which network interface device 20A receives optical signal there is a corresponding wavelength at which network interface device 20A is to transmit an optical signal. For instance, when controller circuit 36 configures TF 50 to pass a particular wavelength so that network interface device 20A can receive downstream optical signals at that particular wavelength, there is an upstream wavelength that corresponds to the downstream wavelength at which network interface device 20A is to transmit an optical signal. In one or more examples, at each instance that controller circuit 36 configures TF 50 for a particular downstream wavelength, controller circuit 36 may configure laser 42 to transmit at the corresponding upstream wavelength. Controller circuit 36 may transmit a control signal to laser 42 to configure laser 42 to transmit at the corresponding upstream wavelength.

By controlling the filter wavelength of TF 50 and the wavelength at which laser 42 transmits, controller circuit 36 may determine a wavelength at which network interface device 20A is operating. However, there may be other example ways in which controller circuit 36 determines the wavelength at which network interface device 20A is operating such as receiving information indicating the wavelength at which network interface device 20A should operate. In general, network interface device 20A may be configurable to operate at a plurality of different wavelengths, and the wavelength at which network interface device 20A operates includes at least one of an optical wavelength at which laser 42 is transmitting optical data or an optical wavelength at which PD 48 is receiving optical data.

While network interface device 20A is operating at a wavelength or wavelength pair, a user may not be knowledgeable of the wavelength at which network interface device 20A is operating. In the example techniques described in this disclosure, network interface device 20A may output a sensory output to indicate the wavelength at which network interface device 20A is operating. An example, one or more LEDs 46 may illuminate at a particular color associated with a particular wavelength to indicate the wavelength at which network interface device 20A is operating. However, other examples of sensory output are possible such as audio or tactile outputs, as well as other types of visual outputs.

The one or more LEDs 46 may be located within network interface device 20A and illuminate through a display screen of network interface 20A. As an example, network interface device 20A includes a translucent display screen, and LEDs 46 may be located behind the display screen and illuminate through the screen. Other ways to configure LEDs 46 to illuminate through network interface 20A are possible, including placing LEDs 46 on the external part of the housing of network interface device 20A.

Figure 4:
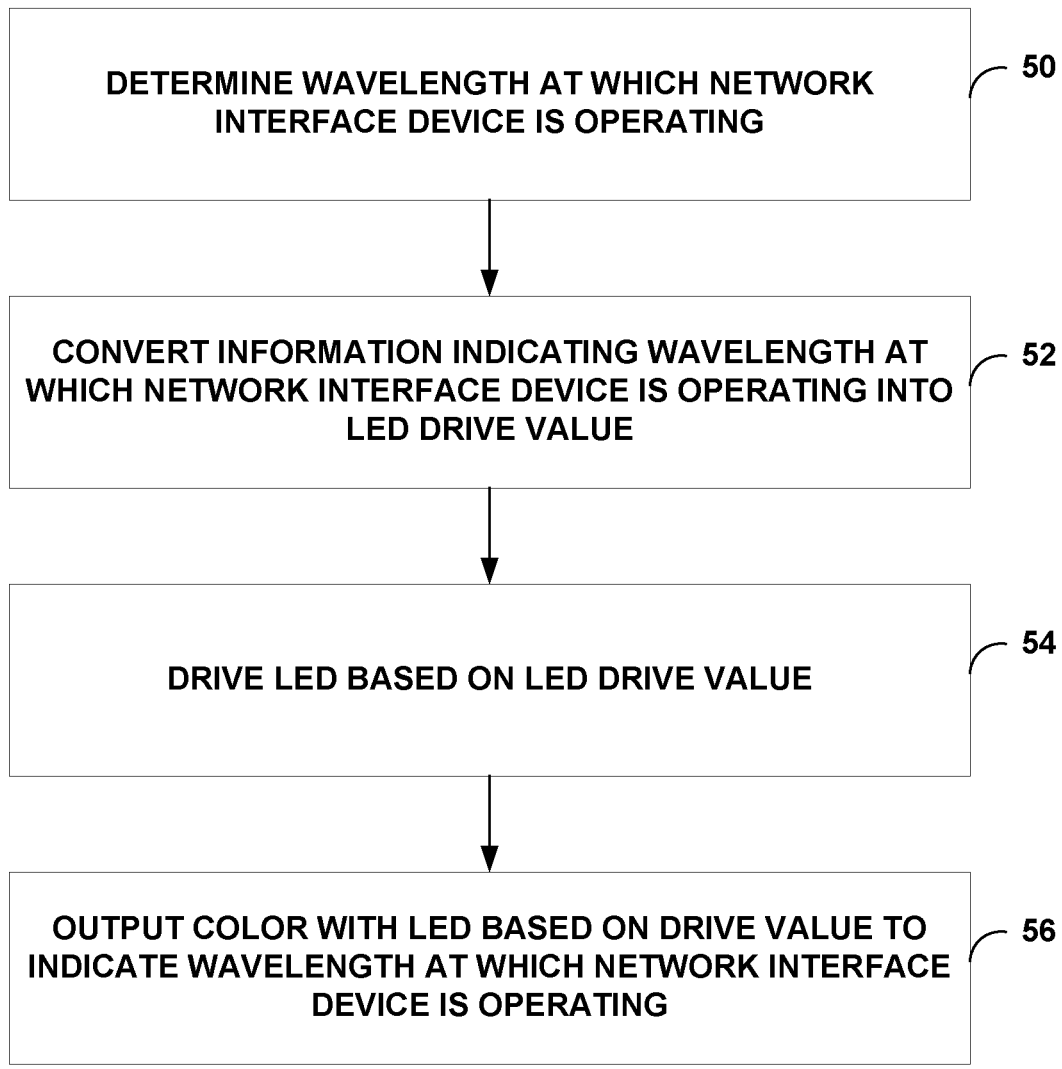
FIG. 4 is a flowchart illustrating a method of operation of indicating a wavelength at which a network interface device is operating in accordance with one or more aspects of this disclosure.

In the example of FIG. 4, controller circuit 36 outputs information indicating a wavelength to LED controller circuit 40. As one example, the information indicating the wavelength may be a wavelength identification value (wavelength ID). For instance, the wavelength ID for a first downstream wavelength and first upstream wavelength may be one, the wavelength ID for a second downstream wavelength and second upstream wavelength may be two, and so forth. Controller circuit 36 may output a wavelength ID to LED controller circuit 40, where the wavelength ID corresponds to the downstream and upstream wavelengths at which network interface device 20A is operating.

LED controller circuit 40 may convert the information indicating the wavelength at which network interface device 20A is operating (e.g., wavelength ID) into an LED drive value. As illustrated, LED controller circuit 40 may store lookup table 44 in its local memory, but may store lookup table 44 in external memory alternatively or additionally. To convert the information indicating the wavelength to an LED drive value, LED controller circuit 40 may parse lookup table 44 for the information indicating the wavelength at which network interface device 20A is operating, and identify the LED drive value stored in lookup table 44 that corresponds to the information indicating the wavelength.

For instance, assume that LED controller circuit 40 received the wavelength ID of 3. In this example, LED controller circuit 40 may parse through lookup table 44 until LED controller circuit 40 found an entry in lookup table 44 with wavelength ID 3 (e.g., fourth entry in example of FIG. 3). LED controller circuit 40 may identify the LED drive value associated with wavelength ID 3 (e.g., LED drive value of 011).

Each of the LED drive values may be associated with a wavelength or wavelength pair, and when one or more LEDs 46 are driven based on the LED drive value, one or more LEDs 46 illuminate at a particular color. For example, LED controller circuit 40 may drive one or more LEDs 46 based on the LED derive value to cause one or more LEDs 46 to illuminate to output at a color that indicates the wavelength at which network interface device 20A is operating.

One or more LEDs 46 may each include three LEDs (red LED, green LED, and blue LED) that can each be selectively driven to generate different colors. For example, each one of LEDs 46 may be configured to output up to eight different colors. Table 1 below indicates the different ways in each of the red-green-blue LEDs may be driven to generate the different colors.

TABLE 1

| RED | GREEN | BLUE | COLOR |
|-----|-------|------|-------|
| 0 | 0 | 0 | BLACK (off) |
| 0 | 0 | 1 | Blue |
| 0 | 1 | 0 | Green |
| 0 | 1 | 1 | Cyan |
| 1 | 0 | 0 | Red |
| 1 | 0 | 1 | Magenta |
| 1 | 1 | 0 | Yellow |
| 1 | 1 | 1 | White |

In Table 1, if network interface device 20A is off or not in operating mode, LED controller circuit 40 may output the serial value of 000 so that one or more LEDs 46 output no color or are black. If LED controller circuit 40 receives the wavelength ID of 1, LED controller circuit 40 may output the serial value of 001, as illustrated in FIG. 3. In this case, the red and green LEDs in each one of LEDs 46 is off, and the blue LED in each one of LEDs 46 is on, and the output from network interface device 20A is a blue color. As another example, if LED controller circuit 40 receives the wavelength ID of 5, LED controller circuit 40 may output the serial value of 101, as illustrated in FIG. 3. In this case, the green LEDs in each one of LEDs 46 is off, and the red and blue LEDs in each one of LEDs 46 is on, and the output from network interface device 20A is a magenta color. LED controller circuit 40 may use SPI or IIC protocol to output the serial information to LEDs 46.

Based on the above example, the user may be able to determine the wavelength at which network interface device 20A is operating based on the color illuminating out of network interface device 20A. In some examples, if network interface device 20A switches from operating at one wavelength to another wavelength, then LED controller circuit 40 may output a different LED drive value to cause network interface device 20A to illuminate at a different color.

The above example is one way in which network interface device 20A may be configured to indicate the wavelength at which network interface device 20A is operating. However, there may be other ways to cause network interface device 20A to provide sensory output used to indicate the operating wavelength or otherwise provide additional information. As one example, during activation to a first wavelength pair, LED controller circuit 40 may cause one or more LEDs 46 to blink at a first color (e.g., by periodically sending a serial value associated with the first color followed by a value that turns off all the LEDs), and then if activation is completed (e.g., network interface device 20A is confirmed to communicate at the first wavelength pair), then LED controller circuit 40 may cause LEDs 46 to illuminate constantly at the first color. If activation is not complete, then network interface device 20A may attempt to communicate a second wavelength pair. In this case, LED controller circuit 40 may cause one or more LEDs 46 to blink at the second color during activation to the second wavelength pair. If activation is complete, then LED controller circuit 40 may cause one or more LEDs 46 to illuminate constantly at the second color.

The above examples described example ways in which network interface device 20A may indicate the operating wavelength. However, the examples are not so limited. In some examples, network interface device 20A may be configured to provide general information of interest. For instance, controller circuit 36 may receive information from OLT 12N of a severe weather warning. In response, controller circuit 36 may output an identification value that is not for a wavelength, but rather reserved for information of interest, to LED controller circuit 40. LED controller circuit 40 may parse lookup table 44 to identify an LED drive value associated with the information interest and cause LEDs 46 to output a color indicative of severe weather. There may be various types of information of interest. In this manner, the techniques described in this disclosure may be used to leverage network interface device 20A itself as a medium by which information can be conveyed and a useful tool for the user.

FIG. 4 is a flowchart illustrating a method of operation in accordance with one or more aspects of this disclosure. In the example illustrated in FIG. 4, network interface device 20A may be configured to illuminate at a particular color to indicate the wavelength at which it is operating.

Controller circuit 36 (e.g., a first controller circuit) may determine a wavelength at which network interface device 20A is operating (50). Network interface device 20A is configurable to operate at a plurality of different wavelengths, and the wavelength at which network interface device 20A is operating includes at least one of an optical wavelength at which laser 42 of network interface device 20A is transmitting optical data or an optical wavelength at which PD 48 of network interface device 20A is receiving optical data. There may be various ways in which controller circuit 36 may determine the wavelength such as by cycling through possible wavelength pairs until controller circuit 36 determines the wavelength at which network interface device 20A is should be operating, or based on information indicating the operating frequency at which network interface device 20A should be operating.

LED controller circuit 40 (e.g., a second controller circuit) may convert information indicating the wavelength at which network interface device 20A is operating into an LED drive value (52). For example, LED controller circuit 40 may receive information indicating the wavelength from controller circuit 36, and may parse lookup table 44 until LED controller circuit 40 arrives at the entry for the wavelength. LED controller circuit 40 may identify the LED drive value that corresponds to the wavelength as stored in lookup table 44.

After determining the LED drive value, LED controller circuit 40 may drive one or more LEDs 46 based on the LED drive value to cause one or more LEDs to illuminate at a particular color associated with the LED drive value (54). For example, the second controller circuit (e.g., LED controller circuit 4) may cause network interface device 20A to output a sensory output that indicates the wavelength at which network interface device 20A is operating. The first controller circuit (e.g., controller circuit 36) and the second controller circuit (e.g., LED controller circuit 40) may be part of the same circuit or different circuits. In response, one or more LEDs 46 may output color based on drive value to indicate wavelength at which network interface device 20A is operating (56).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining a first wavelength at which a network interface device is operating,
   wherein the network interface device operates in a multiple wavelength system and is configurable to operate at a plurality of different wavelengths of the multiple wavelength system by tuning an operation of the network interface device,
   wherein tuning the operation of the network device comprises changing operation of the network interface device between two or more of the different wavelengths, and
   wherein the first wavelength at which the network interface device is operating comprises at least one of an optical wavelength at which a laser of the network interface device is transmitting optical data or an optical wavelength at which a photodiode of the network interface device is receiving optical data;
   outputting, with the network interface device, a first sensory output that indicates the first wavelength at which the network interface device is operating;
   determining that the network interface device changed operation from the first wavelength to a second, different wavelength; and
   outputting, with the network interface device, a second sensory output that indicates the second wavelength at which the network interface device is operating.

2. The method of claim 1, wherein outputting the first sensory output comprises illuminating a light emitting diode (LED) to output at a first color that indicates the wavelength at which the network interface device is operating.

3. The method of claim 1, wherein determining the first wavelength comprises determining the first wavelength during initialization of the network interface device.

4. The method of claim 1, further comprising:
   converting information indicating the first wavelength at which the network interface device is operating into a light emitting diode (LED) drive value; and
   driving an LED based on the LED drive value,
   wherein outputting the first sensory output comprises responsive to the driving of the LED, illuminating the LED to output at a first color that indicates the first wavelength at which the network interface device is operating.

5. The method of claim 4, wherein converting information indicating the first wavelength at which the network interface device is operating comprises:
   identifying in a lookup table the information indicating the first wavelength at which the network interface device is operating; and
   identifying the LED drive value stored in the lookup table that is mapped to the information indicating the first wavelength at which the network interface device is operating.

6. The method of claim 1, wherein outputting the first sensory output comprises illuminating a light emitting diode (LED) to output at a first color that indicates the first wavelength at which the network interface device is operating
   wherein outputting the second sensory output comprises illuminating the LED to output at a second, different color that indicates the second wavelength at which the network interface device is operating.

7. The method of claim 1, further comprising:
   determining information of interest; and
   outputting, with the network interface device, a third sensory output further configured to indicate the information of interest.

8. A network interface device comprising:
   a laser;
   a photodiode;
   a first controller circuit configured to:
      determine a first wavelength at which the network interface device is operating,
      wherein the network interface device operates in a multiple wavelength system and is configurable to operate at a plurality of different wavelengths of the multiple wavelength system by tuning an operation of the network interface device,
      wherein the first controller circuit is configured to tune the operation of the network device by changing operation of the network interface device between two or more of the different wavelengths, and wherein the first wavelength at which the network interface device is operating comprises at least one of an optical wavelength at which the laser of the network interface device is transmitting optical data or an optical wavelength at which the photodiode of the network interface device is receiving optical data; and determine that the network interface device changed operation from the first wavelength to a second, different wavelength; and a second controller circuit configured to:

cause the network interface device to output a first sensory output that indicates the first wavelength at which the network interface device is operating; and cause the network device to output a second sensory output that is configured to indicate the second wavelength at which the network interface device is operating.

9. The network interface device of claim 8, further comprising:

one or more light emitting diodes (LEDs), wherein the second controller circuit comprises an LED controller circuit, and wherein to cause the network interface device to output the first sensory output, the LED controller circuit is configured to cause the one or more LEDs to output at a first color that indicates the first wavelength at which the network interface device is operating.

10. The network interface device of claim 8, wherein the first controller circuit is configured to determine the first wavelength during initialization of the network interface device.

11. The network interface device of claim 8, further comprising:

one or more light emitting diodes (LEDs);

wherein the second controller circuit is configured to:

convert information indicating the first wavelength at which the network interface device is operating into an LED drive value; and drive the one or more LEDs based on the LED drive value to illuminate the one or more LEDs to output at a first color that indicates the first wavelength at which the network interface device is operating.

12. The network interface device of claim 11, wherein to convert information indicating the first wavelength at which the network interface device is operating, the second controller circuit is configured to:

identify in a lookup table the information indicating the first wavelength at which the network interface device is operating; and identify the LED drive value stored in the lookup table that is mapped to the information indicating the first wavelength at which the network interface device is operating.

13. The network interface device of claim 8, wherein the first sensory output comprises one or more light emitting diodes (LEDs) outputting at a first color that indicates the first wavelength at which the network interface device is operating, and wherein the second sensory output comprises the one or more LEDs outputting at a second, different color that indicates the second wavelength at which the network interface device is operating.

14. The network interface device of claim 8, wherein the first controller circuit is configured to determine information of interest, and wherein the second controller circuit is configured to cause the network interface device to output a third sensory output further configured to indicate the information of interest.

15. A non-transitory computer-readable storage medium storing instructions thereon that when executed cause one or more processors of a network interface device to: determine a first wavelength at which the network interface device is operating, wherein the network interface device operates in a multiple wavelength system and is configurable to operate at a plurality of different wavelengths of the multiple wavelength system by tuning an operation of the network interface device, wherein tuning the operation of the network device comprises changing operation of the network interface device between two or more of the different wavelengths, and wherein the first wavelength at which the network interface device is operating comprises at least one of an optical wavelength at which a laser of the network interface device is transmitting optical data or an optical wavelength at which a photodiode of the network interface device is receiving optical data; cause the network interface device to output a first sensory output that indicates the first wavelength at which the network interface device is operating—determine that the network interface device changed operation from the first wavelength to a second, different wavelength; and cause the network device to output a second sensory output that indicates the second wavelength at which the network interface device is operating.

16. The non-transitory computer-readable storage medium of claim 15, wherein the instructions that cause the one or more processors to determine the first wavelength comprise instructions that cause the one or more processors to determine the wavelength during initialization of the network interface device.

17. The non-transitory computer-readable storage medium of claim 15, wherein the first sensory output comprises one or more light emitting diodes (LEDs) outputting at a first color that indicates the first wavelength at which the network interface device is operating, and wherein the second sensory output comprises the one or more LEDs outputting at a second, different color that indicates the second wavelength at which the network interface device is operating.

18. A network interface device comprising:

a laser;

a photodiode;

means for determining a first wavelength at which the network interface device operates in a multiple wavelength system and is operating, wherein the network interface device is configurable to operate at a plurality of different wavelengths of the multiple wavelength system by tuning an operation of the network interface device, wherein tuning the operation of the network device comprises changing operation of the network interface device between two or more of the different wavelengths, and wherein the first wavelength at which the network interface device is operating comprises at least one of an optical wavelength at which the laser of the network interface device is transmitting optical data or an optical wavelength at which the photodiode of the network interface device is receiving optical data;

means for outputting a first sensory output that indicates the first wavelength at which the network interface device is operating;

means for determining that the network interface device changed operation from the first wavelength to a second, different wavelength; and means for outputting a second sensory output that indicates the second wavelength at which the network interface device is operating.

19. The network interface device of claim 18, wherein the means for determining the first wavelength comprises means for determining the wavelength during initialization of the network interface device.

20. The network interface device of claim 18, wherein the means for outputting the first sensory output comprises means for illuminating a light emitting diode (LED) to output at a first color that indicates the first wavelength at which the network interface device is operating, and wherein the means for outputting the second sensory output comprises means for illuminating the LED to output at a second, different color that indicates the second wavelength at which the network interface device is operating.

* * * * *